United States Patent [19]

Petlevich et al.

[11] 4,091,385

[45] May 23, 1978

[54] DOPPLER RADAR FLOWMETER

[75] Inventors: Walter J. Petlevich, Uniontown; Edward F. Sverdrup, Adamsburg, both of Pa.

[73] Assignee: The United States of America as represented by the United States Department of Energy, Washington, D.C.

[21] Appl. No.: 744,495

[22] Filed: Nov. 24, 1976

[51] Int. Cl.$^2$ .............................................. G01S 9/44
[52] U.S. Cl. ........................................ 343/8; 343/17.7
[58] Field of Search ................................... 343/8, 17.7

[56] References Cited

U.S. PATENT DOCUMENTS

| 3,277,477 | 10/1966 | Evans | 343/17.7 |
| 3,438,031 | 4/1969 | Fathauer | 343/8 |
| 3,550,070 | 12/1970 | McLeod, Jr. | 343/8 X |
| 3,618,084 | 11/1971 | Balsiger | 343/8 X |

FOREIGN PATENT DOCUMENTS 606,650  10/1960  Canada ..................................... 343/8

*Primary Examiner*—T.H. Tubbesing
*Attorney, Agent, or Firm*—Dean E. Carlson; Paul Devinsky

[57] ABSTRACT

A Doppler radar flowmeter comprises a transceiver which produces an audio frequency output related to the Doppler shift in frequency between radio waves backscattered from particulate matter carried in a fluid and the radiated radio waves. A variable gain amplifier and low pass filter are provided for amplifying and filtering the transceiver output. A frequency counter having a variable triggering level is also provided to determine the magnitude of the Doppler shift. A calibration method is disclosed wherein the amplifier gain and frequency counter trigger level are adjusted to achieve plateaus in the output of the frequency counter and thereby allow calibration without the necessity of being able to visually observe the flow.

5 Claims, 4 Drawing Figures

DETAILED DESCRIPTION OF A PREFERRED EMBODIMENT

Referring to FIG. 1, a flowmeter, which is constructed according to the present invention and is generally denoted 10, basically comprises a transceiver 20, which radiates microwave frequency radio waves, together with associated processing and indicating units. Transceiver 20 radiates radio waves through a conventional sight glass port 22 which is transparent to microwaves into a conduit 24 containing a fluid carrying particulate matter 26, the velocity of which is to be measured. Transceiver 20 also receives radio waves backscattered by particulate matter in the path of the radiated radio waves and produces a first output signal which is related to the Doppler shift in frequency between the radiated and received radio waves. In accordance with the well-known Doppler equation, i.e., $\Delta f = (2\, v\, f_o/c) \cos \theta$, where $\Delta f$ represents the magnitude of the Doppler shift, $v$ represents the velocity of the backscattering particulate matter, $f_o$ represents the frequency of the radiated electromagnetic waves, $c$ is the velocity of the radio waves in the fluid, and $\theta$ is in the angle of incidence of the radiated radio waves with respect to the backscattering particulate matter, the output of transceiver 20 is thus related to the velocity of flow of the particulate matter. Transceiver 20 may be of conventional design, such as a Frequency West DMX 146 radar transceiver, which generates a 10.5 gigahertz radio wave. Preferably, only a single microwave horn antenna 27 is utilized.

A typical output produced by transceiver 20 is illustrated in FIG. 2. As shown, the output of transceiver 20 comprises a signal 28 having a complex waveform of varying amplitude. Signal 28 comprises a first variable amplitude component having a frequency equal to the amount of the Doppler frequency shift between the radiated and received sound waves, and a second noise component which is superimposed on the first component.

When flowmeter 10 is used to measure flow velocities in such conduits as high temperature, pressurized chemical reactors, discontinuities in the pyrex or quartz windows 22 which are required, as well as in the thermal insulation used in such conduits, causes reflections of the radio waves radiated by transceiver 20 to occur at each interface between the different transmission mediums. To achieve maximum power transfer through such windows and conduit insulation, flowmeter 10 must be "tuned" by positioning transceiver 20 with respect to window 22 at a distance where the maximum returned signal occurs.

Flowmeter 10 further comprises a variable gain amplifier 30 for amplifying output signal 28 produed by transceiver 20, a low-pass filter 40 for removing high frequency noise components from the output signal produced by preamplifier 30, and a programmable frequency counter 50 having a variable trigger level for measuring the frequency of the component of signal 28 which is attributable to the Doppler shift in frequency between the radiated and received radio waves. Visual display of the amplified and filtered tansceiver output waveforms are provided by conventional cathode ray tube displays 35 and 45, respectively. An indication of the trigger level of frequency counter 50 is provided by a conventional digital voltmeter display 55.

Preamplifier 30 may be of conventional design and can comprise, for example, a Burr Brown Model No. 3640. The gain of preamplifier 30 influences the signal to noise ratio of flowmeter 10. As will be explained more fully hereinbelow, low gain settings cause only isolated peaks in the output from filter 40 to be counted by counter 50, which result in low "indicated" velocities. High preamplifier gain settings increase the number of peaks in the output of filter 40 caused by noise which are counted by counter 50 and thus result in high "indicated" velocities.

Low-pass filter 40 may also be of conventional design, and can, for example, comprise Burr Brown active filter Model ATF 76. Filter 40 rejects high frequency noise fluctuations caused by variations in the velocity of the particles being measured, and by electronic interference signals. The cutoff frequency of filter 40 determines the maximum velocity which can be measured.

Frequency counter 50 may be of conventional design as well, and, for example, can comprise a Hewlett Packard Model 5330/B. By using a programmable frequency counter, the measured frequency of the output signal from filter 40 may be automatically converted to particle velocity in accordance with the well known Doppler equation and displayed directly as a velocity measurement. The triggering level of counter 50 dertermines which fluctuation or peaks in the output of filter 40 are counted. If the triggering level is set at too high a level, only isolated peaks are counted, and counter 50 counts low. Conversely, if the triggering level is set at too low a level, noise peaks are counted as well as the peaks attributable to the Doppler shift in frequency, and counter 50 counts high.

Flowmeter 10 is calibrated by adjusting the gain of amplifier 30 and the triggering level of frequency counter 50. Calibration may be accomplished with reference to a flow of particulate matter having a known velocity. In addition, calibration of flowmeter 10 may be achieved independently, without reference to a known flow, in accordance with the following method. The output from preamplifier 30 is observed and the gain thereof is adjusted such that the largest positive peak of the preamplifier 30 output is substantially equal to some predetermined level. In an embodiment of flowmeter 10 using the illustrative commercial components referred to hereinabove, a predetermined value of 500 mv has been successfully used. The triggering level of frequency counter 50 is then adjusted by increasing the level from a first level where frequency counter 50 counts noise peaks to a second level corresponding to the plateau in the output of frequency counter 50 where the variation in the output thereof with respect to increases in the triggering level is at a minimum. The next step is to readjust the gain of preamplifier 30 by increasing the level thereof from a first level where frequency counter 50 counts only isolated peaks in the output of filter 40 to a second level corresponding to the first plateau in the output of frequency counter 50 where the variation in the output thereof with respect to increases in the gain of preamplifier 30 is at a minimum.

The final step in the calibration method is to readjust the triggering level of frequency counter 50 in accordance with the trigger level adjusting step described hereinabove to obtain a final triggering level corresponding to the plateau in the output characteristic of frequency counter 50 with the gain of preamplifier 30 at its readjusted setting. The final triggering level may, but need not be, the same level which was obtained as a result of the initial adjustment of the triggering level.

DOPPLER RADAR FLOWMETER

FIELD OF THE INVENTION

This invention relates generally to Doppler flowmeters, and more particularly to Doppler radar flowmeters and signal processing methods and apparatus therefor.

BACKGROUND OF THE INVENTION

Utilization of the Doppler effect in flowmeters for measuring the velocity of flow of such fluids as blood in such conduits as blood vessels are well known. Examples of such flowmeters are described in U.S. Pat. Nos. 3,732,532 (Flaherty et al); 3,766,517 (Fahrback); and 3,861,211 (Dewan). However, such flowmeters employ ultrasonic wave energy, which is not satisfactory for velocity measurements of solid materials carried by high temperature gases at elevated pressures through pipes or chemical process reactors, since such wave energy cannot effectively penetrate conventional sight ports used with pressure vessels. Although the Doppler effect has been utilized in intrusion detection systems which employ microwave electromagnetic wave energy, see, e.g., U.S. Pat. No. 3,845,461 (Foreman), the use of Doppler radar techniques to measure the flow of particulates has been limited. An example of a system used to monitor transported materials in pneumatic conveying applications is described in the following articles by Harris: J. Harris, Proc. Symp., "The Measurement of Pulsating Flow," p. 2–3, April 1970, Institute of Measurement and Control; "Flow Measurement Using a Microwave Doppler Meter," International Conference on Modern Developments in Flow Measurement, A.E.R.E., Harwell, p. 21–23, (September 1971; "Flow Measurement Using Microwave Radar Techniques," Powder Technology, p. 85–89, Vol. 6, 1972.

A major disadvantage of such conventional microwave Doppler flowmeters is distortion of measurements due to local noise fluctuations. Attempts at reducing the effect of noise have involved the use of multiple antennas and a signal correlating wave guide to cancel, at microwave frequencies, the local noise fluctuations. As a consequence, conventional microwave Doppler flowmeters require microwave filtering and amplification equipment.

A further major disadvantage of prior art flowmeters concerns the calibration difficulties associated therewith when the particulate flow to be measured cannot be observed.

SUMMARY OF THE INVENTION

These and other disadvantages of the prior art are overcome by the Doppler radar flowmeter and calibration method of the present invention. In accordance with one aspect of the invention, a flowmeter comprises a radar transmitter and receiver which respectively radiate radio waves at a predetermined microwave frequency at least partially through the fluid, and receive at least a portion of the radio waves backscattered by at least some of the particulate matter in the path of the radiated radio waves. A signal processor connected to the receiver produces a signal related to the Doppler shift in frequency between the back-scattered radio waves and the radiated radio waves, and thus related to the velocity of flow of the particulate matter being measured. Preferably, the signal processor produces audio frequency signals. Advantageously, the transmitter and receiver utilize a single antenna which is movable, such that the distance of the antenna from the fluid being measured may be adjusted to maximize the strength of the back-scattered radio waves received.

According to an important aspect of the invention, the flowmeter includes a frequency counter having a variable trigger level, such that the frequency counter is responsive only to signals produced by the signal processor which exceed a predetermined level. A variable gain amplifier and filter may also be provided for, respectively, varying the amplitude of the signal processor output, and removing frequency components therefrom having a frequency greater than a predetermined value.

A flowmeter constructed according to the present invention is preferably calibrated in accordance with the following method. The gain of the variable gain amplifier is first adjusted such that the output thereof has a predetermined peak value. The triggering level of the frequency counter is then adjusted by increasing the level from a first level, where the frequency counter is responsive to peaks in the amplifier output signal caused by noise, to a second level corresponding to a plateau in the frequency counter output where variation in the counter output with respect to increases in the triggering level is at a minimum. The gain of the amplifier is then readjusted by increasing the gain from a first level where the frequency counter is only partially responsive to fluctuations in the output of the amplifier attributable to the Doppler shift, to a second level corresponding to the first plateau in the frequency counter output where variation in the frequency counter output with respect to increases in the amplifier gain is at a minimum. A preferable additional step is to readjust the triggering level of the frequency counter in a manner similar to the adjusting step described hereinabove.

The flowmeter of the present invention is uniquely adapted for use in many difficult chemical process applications, since the use of a variable gain amplifier in combination with a frequency counter having an adjustable triggering level allows calibration of the flowmeter without the need for observing the particle motion and increases the signal-to-noise ratio of the system. In accordance with another aspect of the invention, all processing of the Doppler signal, i.e., filtering, amplification, and counting, is performed at audio, rather than microwave, frequencies, thus greatly reducing the cost and complexity of the processing equipment required. Still further, only one microwave antenna is needed, thereby reducing the space required to obtain a velocity measurement.

Other features and advantages of the invention will be set forth in, or apparent from, the detailed description of a preferred embodiment found hereinbelow.

BRIEF DESCRIPTION OF THE DRAWINGS

For purposes of illustration, FIGS. 3 and 4 show (i) the output of frequency counter 50 versus the triggering level thereof and (ii) the output of counter 50 versus the gain of preamplifier 30, respectively, for the illustrative embodiments of frequency counter 50 and the preamplifier 30 referred to hereinabove. Referring in particular to FIG. 3, it can be seen that the output of frequency counter 50 generally decreases as the triggering level increases, from a region, generally denoted by the arrow A, where noise peaks are counted, to a region, generally denoted by the arrow B, where only isolated peaks in the output signal from filter 40 are counted. The above mentioned plateau in the output, where the variation in counter output with respect to triggering level is a minimum, is denoted by the arrow C.

Referring now to FIG. 4, it can be seen that the output of frequency counter 50 generally increases as the gain of preamplifier 30 increases, from a region, generally denoted by arrow D, where only isolated peaks in the output signal from filter 40 are counted, to a region, generally denoted by arrow E, where noise peaks in the output of filter 40 are counted. The above mentioned first plateau in the output of frequency counter 50, where the variation in counter output with respect to preamplifier gain is a minimum, is denoted by the arrow F. As can be seen, at the highest gain levels of preamplifier 30, the output of frequency counter 50 becomes substantially constant, reflecting a condition wherein substantially all of the fluctuations in the output of filter 40 are being counted and further increases in preamplifier gain do not serve to increase the number of signal peaks counted. However, this "plateau" in the output of frequency counter 50 is not utilized in the calibration method referred to hereinabove.

Figure 1:
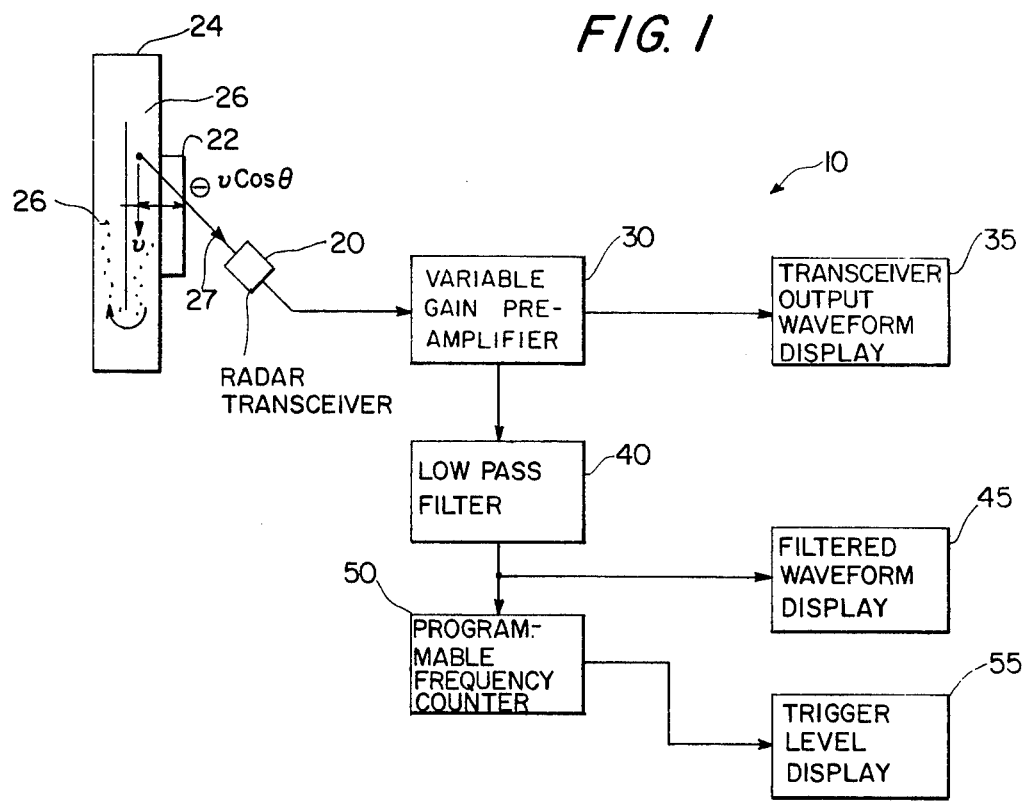
FIG. 1 is a block diagram of a flowmeter constructed according to the present invention.
Figure 4:
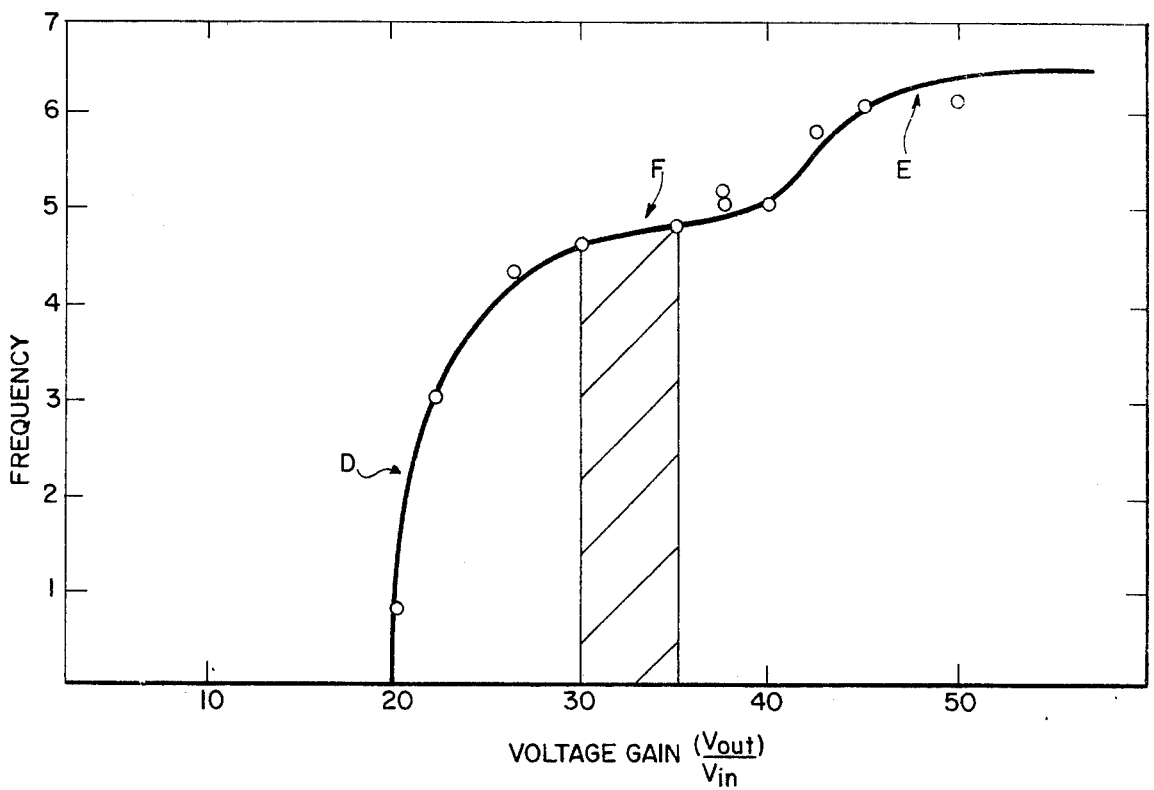
FIG. 4 is a plot of the output of a frequency counter used in the flowmeter of FIG. 1 with respect to the gain of a preamplifier used in the flowmeter of FIG. 1.
Figure 2:
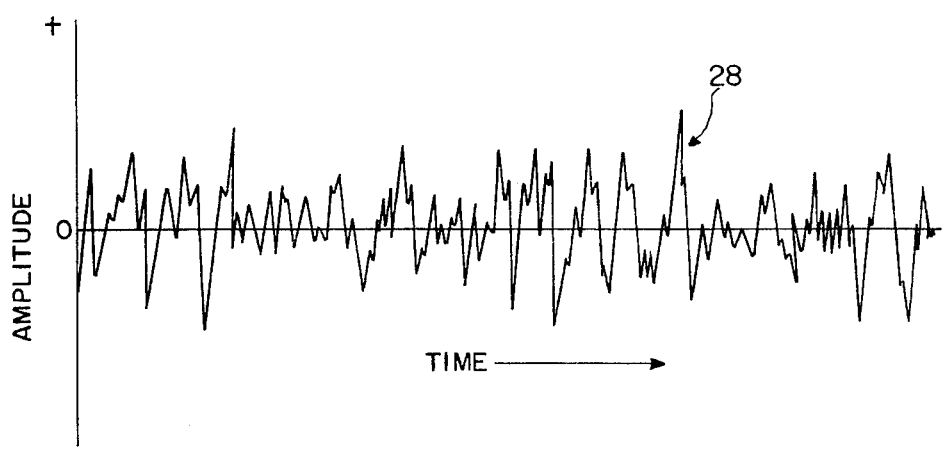
FIG. 2 is a graphical representation of a typical output waveform of a transceiver used in the flowmeter of FIG. 1.
Figure 3:
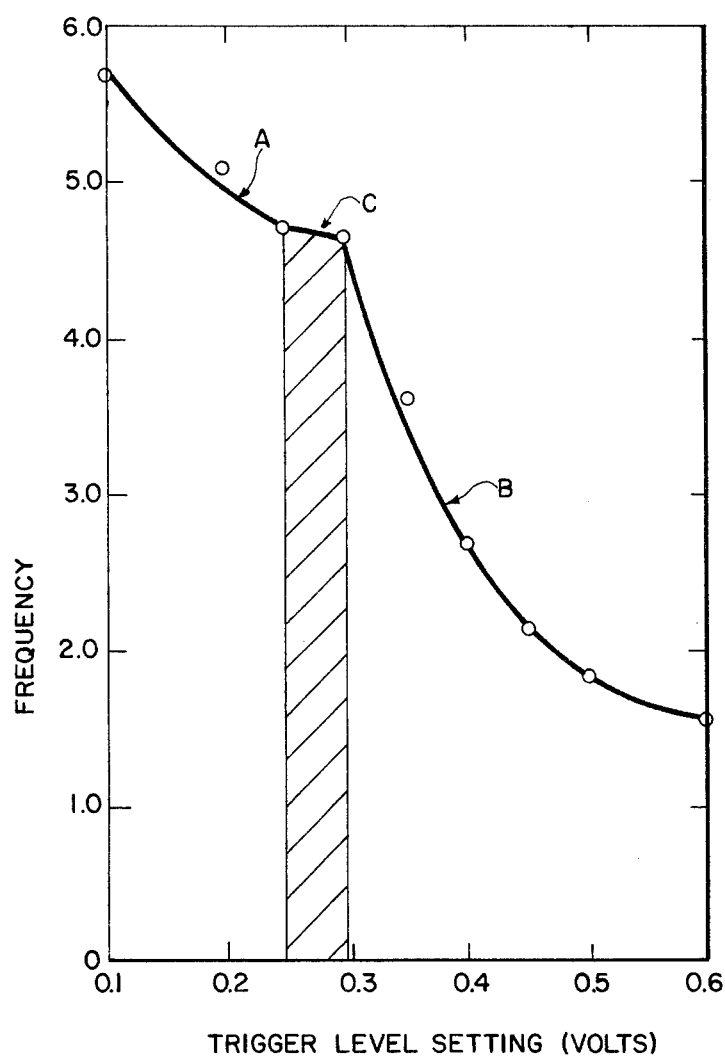
FIG. 3 is a plot of the output of a frequency counter used in the flowmeter of FIG. 1 with respect to the trigger level.

It will be appreciated by those skilled in the art that although the invention has been described relative to an exemplary embodiment thereof, modification and variations can be effected in this embodiment without departing from the scope and spirit of the invention.

We claim:

1. A Doppler radar flowmeter for measuring the velocity of flow of particulate matter carried by a fluid within a conduit comprising:
    transceiver means for radiating radio waves at a predetermined microwave frequency through a microwave window in said conduit and at least partially through said fluid, and for receiving at least a portion of said radio waves back-scattered by at least a portion of said particulate matter in the path of said radiated radio waves;
    means connected to said transceiver means including a variable gain amplifying means for producing a signal of variable amplitude related to the Doppler shift in frequency between said back-scattered radio waves and said radiated radio waves, and thus related to the velocity of flow of the particulate matter;
    frequency counting means responsive solely to peaks in said signal which have an amplitude greater than a variable trigger level of said counter means, for measuring the frequency of said signal;
    wherein said variable gain amplifying means and said variable trigger level of said counter provide calibration means for said flowmeter.

2. The flowmeter of claim 1 further comprising low pass filter means for filtering said signal to remove frequency components therefrom having a frequency greater than a predetermined value.

3. The flowmeter of claim 1 wherein said radiating and receiving means comprise at least one antenna which is movable, such that the distance of said at least one antenna from the fluid may be adjusted to maximize the strength of said back-scattered radio waves received by said receiving means.

4. A method for calibrating a flowmeter, said flowmeter comprising:
    means for radiating radio waves at a predetermined microwave frequency at least partially through the fluid, and for receiving at least a portion of the radio waves back-scattered by at least a portion of the particulate matter in the path of said radiated radio waves;
    means connected to said receiving means for producing a signal related to the Doppler shift in frequency between said back-scattered radio waves and said radiated radio waves, and thus related to the velocity of flow of the particulate matter;
    frequency counting means responsive solely to peaks in said signal which have an amplitude greater than a variable trigger level of said counter means, for measuring the frequency of said signal;
    variable gain amplifying means for varying the amplitude of said signal, wherein said calibration method comprises the steps of:
    adjusting the gain of said amplifying means such that the output signal thereof has a predetermined peak value;
    adjusting the triggering level of said frequency counting means by increasing the level from a first level where said frequency counting means is responsive to peaks in said amplifier output signal caused by noise, to a second level corresponding to the plateau in the output of said frequency counting means where the variation in the output of said frequency counting means with respect to increases in the triggering level is at a minimum;
    readjusting the gain of said amplifying means by increasing the gain from a first level where said frequency counting means is only partially responsive to fluctuations in said signal attributable to said Doppler shift, to a second level corresponding to the first plateau in the output of said frequency counting means where variation in the output of said frequency counting means with respect to increases in the gain of said amplifying means is at a minimum.

5. The calibration method of claim 4 further comprising the step of:
    readjusting the trigger level of said frequency counting means by increasing the level from a third level where said frequency counting means is responsive to peaks in said signal caused by noise, to a fourth level corresponding to the plateau in the output of said frequency counting means where the variation in the output of said frequency counting means with respect to increases in the triggering level is at a minimum.

* * * * *